US008675567B2

(12) United States Patent
Lövsén et al.

(10) Patent No.: US 8,675,567 B2
(45) Date of Patent: Mar. 18, 2014

(54) REACTIVATION OF DEDICATED BEARERS

(75) Inventors: Lars Lövsén, Gothenburg (SE); Peter Hedman, Helsingborg (SE); Maria Belen Pancorbo Marcos, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 41 days.

(21) Appl. No.: 13/547,623

(22) Filed: Jul. 12, 2012

(65) Prior Publication Data

US 2013/0016658 A1    Jan. 17, 2013

(51) Int. Cl.
H04W 4/00    (2009.01)
(52) U.S. Cl.
USPC .......................................................... 370/328
(58) Field of Classification Search
None
See application file for complete search history.

(56) References Cited

U.S. PATENT DOCUMENTS

| | | | |
|---|---|---|---|
| 2005/0122945 A1 | 6/2005 | Hurtta | |
| 2006/0111098 A1* | 5/2006 | Abdel-Kader et al. | 455/421 |
| 2010/0081444 A1* | 4/2010 | Jin et al. | 455/450 |
| 2011/0182190 A1* | 7/2011 | Abdel-Kader | 370/248 |
| 2011/0202647 A1* | 8/2011 | Jin et al. | 709/223 |
| 2011/0274087 A1* | 11/2011 | Liang et al. | 370/331 |
| 2011/0294508 A1* | 12/2011 | Min et al. | 455/436 |
| 2011/0317545 A1* | 12/2011 | Tiwari | 370/216 |
| 2012/0275401 A1* | 11/2012 | Sun | 370/329 |

FOREIGN PATENT DOCUMENTS

| | | |
|---|---|---|
| EP | 0987858 A1 | 3/2000 |
| EP | 1659815 A1 | 5/2006 |
| WO | 0163955 A1 | 8/2001 |

OTHER PUBLICATIONS

3GPP: "3rd Generation Partnership Project; Technical Specification Group Services and System Aspects; Policy and Charging Control Architecture (Release 11)", 3GPP Draft; 23203-B20_CRS_IMPLEMENTED, 3RD Generation Partnership Project 3GPP), Mobile Competence Centre; 650, Route Des Lucioles; F-06921 Sophia-Antipolis Cedex; France, vol. SA WG2. Jun. 2, 2011,XP050548107, 142 pages.
International Search Report from International application No. PCT/EP2011/062094, dated Apr. 24, 2012, 5 pages.

* cited by examiner

*Primary Examiner* — Kibrom T Hailu
(74) *Attorney, Agent, or Firm* — Rothwell, Figg, Ernst & Manbeck, P.C.

(57) ABSTRACT

The present invention relates to re-establishment of dedicated bearers and more particularly, the invention relates to the re-establishment of dedicated bearers when connection is lost temporarily. This is provided in a device, method and system, in a packet based telecommunications network, for receiving on the communication interface an indication that a dedicated bearer for a user equipment, UE, has been deactivated, starting at least one timer, checking if uplink traffic is present for a communication bearer and if uplink traffic is detected on the communication bearer for a deactivated dedicated bearer re-establishing the dedicated bearer and stopping the timer.

17 Claims, 5 Drawing Sheets

REACTIVATION OF DEDICATED BEARERS

TECHNICAL FIELD

This invention relates to re-establishment of dedicated bearers and more particularly, the invention relates to the re-establishment of dedicated bearers when connection is lost temporarily.

BACKGROUND

In some standard implementations of communication protocols such as 3GPP, e.g. in Rel-10, established dedicated bearers are deactivated by a mobility management entity (MME) in case of an S1-release due to loss of radio connection; the deactivation of bearers are specified for Guaranteed Bit Rate (GBR) bearers but not for non-GBR bearers, i.e. best effort bearers. The deactivation of these bearers will be notified to a packet data network gateway (PDN GW or PGW) that will remove policy and charging control (PCC) Rules bound to the removed bearer(s) and then notify an application function (AF) via a Policy and Charging Rules Function (PCRF) that no resources are available for the call/session which will cause the application function (AF) to terminate ongoing calls/sessions for that user equipment (UE). One example of an AF is a Proxy Call Session Control Function (P-CSCF) which is a border control unit of an IP multimedia Core Network (IM CN) subsystem.

At a later stage the UE may recover radio coverage or resume connection in any other way and the UE will then try to establish new calls that will cause the AF to request resources over an Rx interface, the PCRF generates PCC Rules, installs them in a policy and charging enforcement function (PCEF) and this will trigger establishment of dedicated bearer to transfer the associated media for the call/session.

If the UE regain coverage while the user still attempts to communicate with the remote party, then the UE may try to send user data through bearers that allow such traffic i.e. typically best effort bearers that did not got deactivated while the UE was out of coverage. However, as the PCC rules got removed and the AF session was terminated the only way for the user to continue the communication with a remote party is to initiate a new call to the same remote party. However, it is possible to continue communication using a non-GBR quality of service if there is a policy and charging control (PCC) rule, but for re-establishment of communication with respective dedicated QoS service(s) needs to be set up again.

In Release 11 of the 3GPP standard, there is a proposal to preserve the dedicated bearer in case of an S1-release due to loss of radio connection and notify the AF to be able to reject new incoming calls to the UE. This can be found in 3GPP TS 23.203 v. 11.1.0 discussing policy and charging control architecture and more information about the procedures related to this may also be found in TS 23.401 v. 10.3.0 discussing General Packet Radio Service (GPRS) enhancements for Evolved Universal Terrestrial Radio Access Network (E-UTRAN) access.

The network deactivates dedicated bearers for GBR related bearers, when the UE is out of coverage, this will cause release of ongoing calls and the user/UE needs to initiate the calls from scratch that will be re-established when the UE regain communication coverage.

Even when the UE may regain communication coverage within a short period of time, the calls have already been released, and thus calls will have to be reinitiated.

SUMMARY

It is a first object of the invention to improve functionality in relation to deactivation of dedicated bearers and re-establishment of bearers from a temporary deactivation.

This is provided in a network infrastructure device for a packet based telecommunications network. The device comprises at least one processing unit, at least one memory unit, and at least one communication interface. The processing unit may be arranged to execute instructions sets stored in the memory unit for receiving on the communication interface an indication that a dedicated bearer for a user equipment, UE, has been deactivated, starting at least one timer, checking if uplink traffic is present for a communication bearer and if uplink traffic is detected on the communication bearer for a deactivated dedicated bearer, re-establishing the dedicated bearer and stopping the timer.

This advantageously enables quick re-establishment of dedicated bearers, giving priority to the re-establishment of the dedicated bearers that are actually needed, to transfer data when the UE recovers communication coverage.

The device may further be arranged to have a plurality of timers, one for each service or application deactivated for the UE.

Furthermore, a method is provided in telecommunications network infrastructure device for handling of dedicated bearers. The method comprises steps of receiving on a communication interface in the device an indication that a dedicated bearer for a user equipment, UE, has been deactivated, starting at least one timer, checking if uplink traffic is present for a communication bearer and if uplink traffic is detected on the communication bearer: re-establishing at least one dedicated bearer and stopping the timer.

Also a system, in a telecommunications network, for handling activation of dedicated bearers is provided. The system comprises a mobility management node, MME, and a gateway node, GW. The MME may be arranged to send a deactivation message to the GW and the GW may be arranged to receive the deactivation message, start at least one timer, check if uplink traffic is present for a default bearer and if uplink traffic is detected on the default bearer: re-establish the dedicated bearer by sending an establishment message to the MME for re-establishment of at least one dedicated bearer and stop the timer related to the dedicated bearer.

One further advantage of the invention over using a radio area network (RAN) timer is that the decision whether to apply a faster "back to optimized service" for the application will be on a layer were the decision can be taken per application or service provided, i.e. the decision may be taken in the PCRF.

By providing a priority level for different applications or services, the order of re-establishment may be controlled; for instance voice and/or emergency calls may be prioritized over applications not so dependent on delays in re-establishing the dedicated bearers, e.g. html based services.

The present invention enhances user experience by maintaining ongoing calls when the UE loses coverage for a short period of time and saves resources in the network; resources may be released during the time while the UE is out of coverage or otherwise temporarily released, e.g. UE inactivity.

Further advantages of the invention will appear from the following detailed description of the invention.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
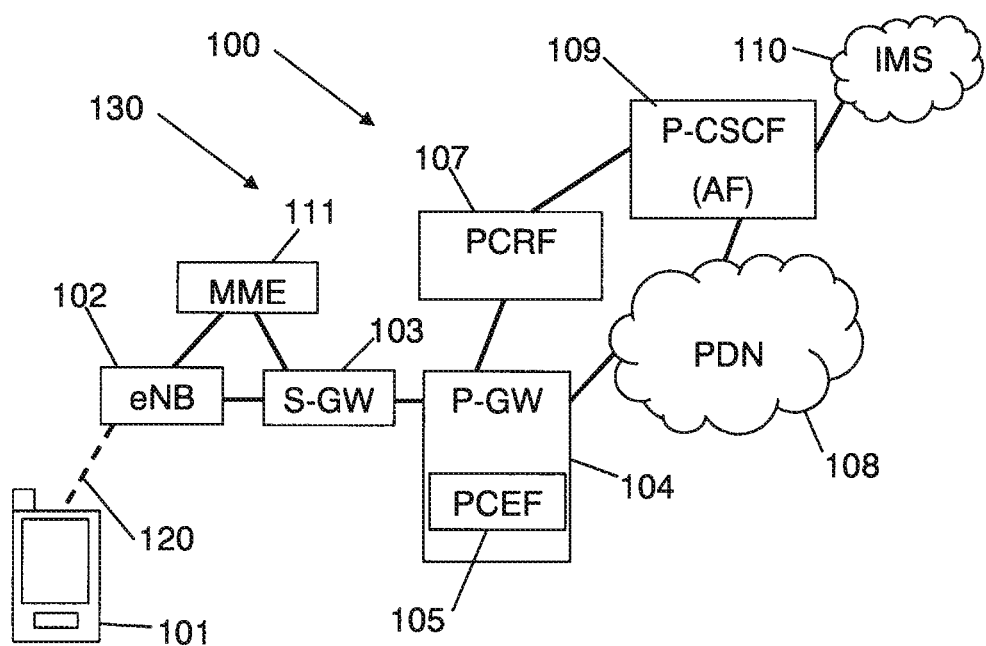
FIG. 1 is a schematic block diagram illustrating an example network according to the present invention.

In FIG. 1 reference numeral 100 indicate a packet based telecommunications infrastructure network according to a first embodiment of the invention. A user equipment (UE) 101, such as a terminal, mobile/cellular phone, smart phone, pocket digital assistant (PDA), tablet computer, laptop, or personal computer, communicates via a wireless communication link 120 with a radio access device, e.g. an eNodeB (eNB) 102 which in turn communicate with the network via a serving gateway (S-GW) 103 and Packet data network gateway (P-GW) 104. A mobility management entity (MME) 111 communicates with both the eNB and the S-GW. The P-GW comprises a Policy and charging enforcement function (PCEF) 105. Furthermore, the network comprises a policy and charging rules function (PCRF) unit 107. The P-GW is connected to a packet data network (PDN) 108 which in turn is connected to an application function (AF) 109, such as a Proxy Call Session Control Function (P-CSCF). The AF may in turn be connected to an IP multimedia Subsystem (IMS) 110 providing content to the UE. The AF/P-CSCF instructs the PCRF which media flows are authorized and their respective authorized Quality of service (QoS) level. The MME and P-GW may together form a system 130 in the packet based telecommunications network.

Figure 2:
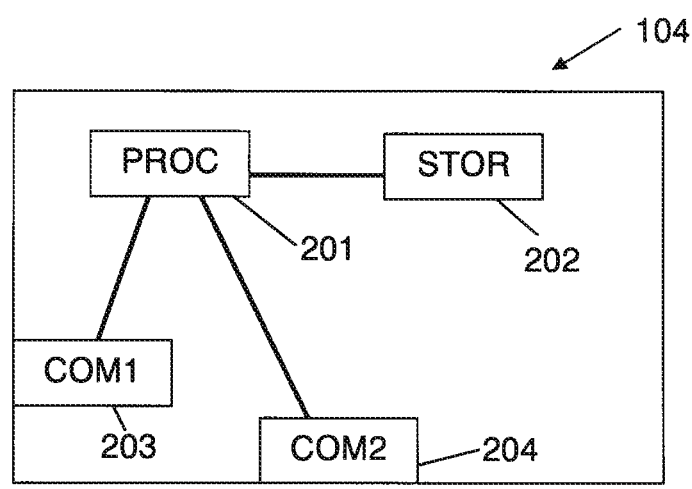
FIG. 2 is a schematic block diagram illustrating an exemplary device according to the present invention.

The P-GW 104 comprise as is shown in FIG. 2, at least one processing unit 201 (PROC), at least one memory unit 202 (STOR) connected to the processing unit, and at least one communication interface 203 and 204 (COM1 and COM2) each connected to the processing unit. The processing unit is arranged to operate instruction sets stored in the memory unit as software in the memory unit which is computer readable. The processing unit is arranged to receive and transmit control and/or data packets using the at least one communication interface. The processing unit is arranged to control data flow within the P-GW between the memory and the communication interfaces and within the processing unit itself depending on functionality operated. The communication interface has been exemplified with two physical interfaces; however, it should be understood that it could be one physical interface or more than two physical interfaces depending on configuration; for example the communication interface may comprise an Ethernet interface or an asynchronous transfer mode (ATM) interface. The processing unit may comprise for instance a micro processor, an application specific integrated circuit (ASIC), digital signal processor (DSP), or field programmable gate array (FPGA). The memory unit may comprise any suitable volatile and/or non-volatile memory in a single unit or as a combination of units, the memory may comprise for instance a solid state memory, e.g. SSD, a random access memory (RAM) of any type, a hard disk (HD), and so on.

Figure 3:
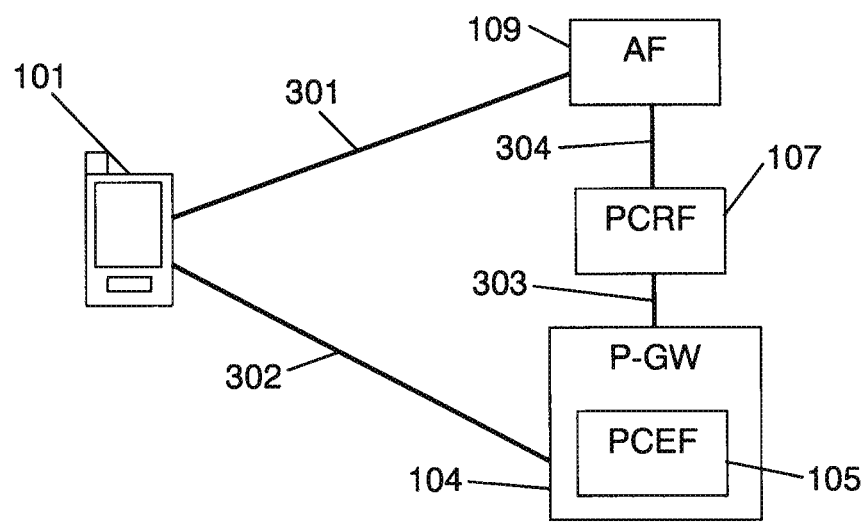
FIG. 3 is a schematic block diagram illustrating an example logical network according to the present invention.

In FIG. 3 functional and logical signalling connections are shown. The UE 101 is connected to the P-GW 104 with the PCEF 105 via an IP Connectivity Access Network (IP-CAN) signalling connection 302, e.g. a 3GPP NAS signalling connection. The P-GW is connected to the PCRF 107 via a Gx interface 303 and the PCRF is in turn connected to the AF 109 via an Rx interface 304. The AF is in turn connected directly with the UE via an application signalling connection 301, e.g. SIP/SDP or HTTP.

The Policy and charging enforcement function (PCEF) 105 provides service data flow detection, policy enforcement and flow based charging functionalities. This functional entity is located at a Gateway, e.g. a gateway GPRS support Node (GGSN) in a general packet radio service (GPRS) case and P-GW in the UMTS/3G/LTE case, or any other gateway as specified in 3GPP standard depending on network architecture. The PCEF, located in the P-GW and operated by the processing unit in the P-GW, provides service data flow detection, user plane traffic handling, triggering control plane session management (where an IP Connectivity Access Network (IP-CAN) permits), QoS handling, and service data flow measurement as well as online and offline charging interactions.

Figure 4:
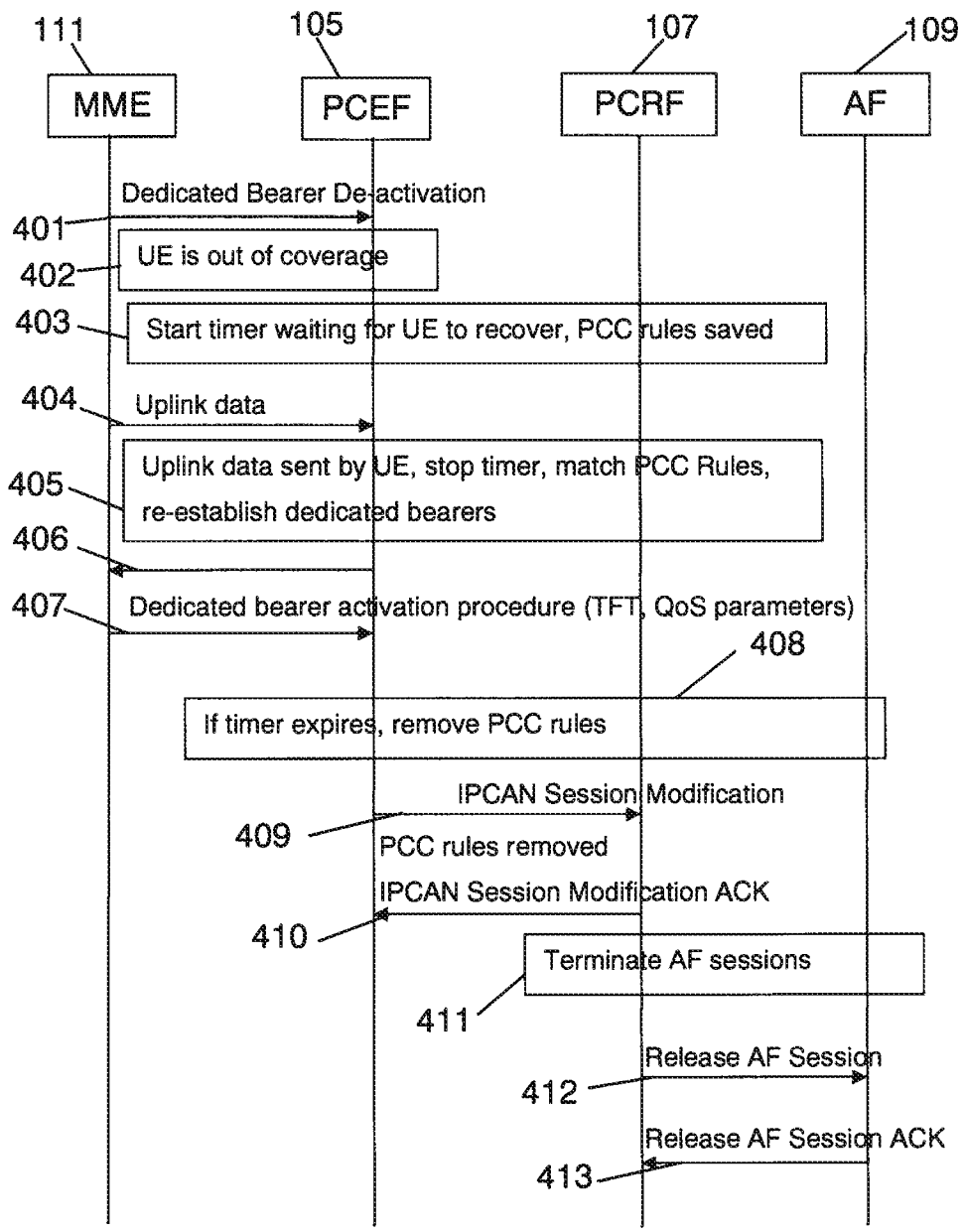
FIG. 4 illustrates schematically a communication flow according to the present invention.

FIG. 4 shows an example of service flow between the mobility management entity (MME) 111, the PCEF 105, the PCRF 107, and the AF 109. The MME sends 401 a message to the PCEF, or a Bearer Binding and Event Reporting Function (BBERF) as will be discussed later in this document, indicating deactivation of a dedicated bearer for instance due to UE being out of radio coverage 402. The PCEF starts 403 at least one recovery timer, e.g. one timer for each service, waiting for the UE to recover, PCC rules are saved, and checks for any uplink data on any communication bearer(s) related to the UE. If uplink data related to a deactivated dedicated bearer with a saved rule is received 404 from UE and the PCEF performs 405 a number of tasks: matches saved PCC rules to the uplink traffic, stops the timer for recovery, and re-establishes dedicated bearers, all deactivated dedicated bearers may be re-established or depending on type of uplink data different dedicated bearers may be re-established matched to PCC rules saved and detected. With a priority for re-establishment per service (or QCI), it may be sufficient to detect any traffic, which indicates that the UE has regained radio coverage or connection. The re-establishment of dedicated bearers comprise sending 406 a message to the MME indicating dedicated bearer activation with suitable parameters such as TFT and QoS parameters in accordance with standard procedures and the MME returns 407 an acknowledgement message. However, if the recovery timer expires before uplink data is detected, the PCEF removes 408 PCC rules, and sends 409 an IP-CAN session modification message to the PCRF which in turn replies 410 with an IP-CAN session modification acknowledgement message. The PCRF and AF terminate 411 AF sessions and the PRCF sends 412 a message to the AF indicating release of AF session(s) and the AF replies 413 with a release AF session acknowledgement message.

The recovery timer may be set depending on type of service for the dedicated bearer(s), for instance services such as emergency call, standard call, streaming video connection, streaming audio connection, and web connection, e.g. html or ftp based protocol, may have different timer values. Also a plurality of recovery timers may be set for each UE depending on the respective dedicated bearers set for each UE if there is a plurality of dedicated bearers for the UE. For instance, an emergency call or standard voice application may have a timer set for several minutes or longer, while an html connection may have a timer value of only a few seconds or milliseconds; however, the timer value for each service or type of communication is not limited to the exemplified, but may take any suitable values and may be controlled by at least one of an operator, service provider, or network owner. The recovery timer determines how long the bearer binding function is to wait before initiating the termination of call/session of that service. Differentiating the timer values enhances the possibility for the system to prioritize between services and provide a better user experience.

The bearer binding function may be set up to re-establish all services when detecting any traffic on the default bearer, where the traffic is related to one of the deactivated dedicated bearers with saved PCC rules; this allows for a quick re-establishment of the dedicated bearers and service(s) used by the UE. In this case, choosing order of the bearers to re-establish may be based on different priorities, such as user experience, QoS need, load, emergency call, priority of communication type, and so on. For instance re-establishing dedicated bearers for voice related applications is of high interest for the user and similar for streaming applications such as music or video related applications, whereas email or web based applications may be down prioritized.

The bearer binding function may alternatively be set up to re-establish only the dedicated bearers related to the service detected; data packets on the default bearer may be sniffed and checked for traffic matching a deactivated PCC rule. If such a deactivated dedicated bearer is matched, that particular dedicated bearer related to the PCC rule is re-established.

The above description applies when the bearer binding is allocated to the PCEF. In another embodiment of the present invention, the bearer binding may be allocated to a Bearer Binding and Event Reporting Function (BBERF), and if this is the case, the detection of the UL traffic on the default bearer and the re-establishment of dedicated bearer is performed by the BBERF, such as the BBERF takes the action as exemplified for the PCEF above. The BBERF is located in an access gateway, such as for instance a serving gateway (S-GW). The BBERF receives QoS information and other PCC information from the PCRF via a Gxx interface (not shown).

Figure 5:
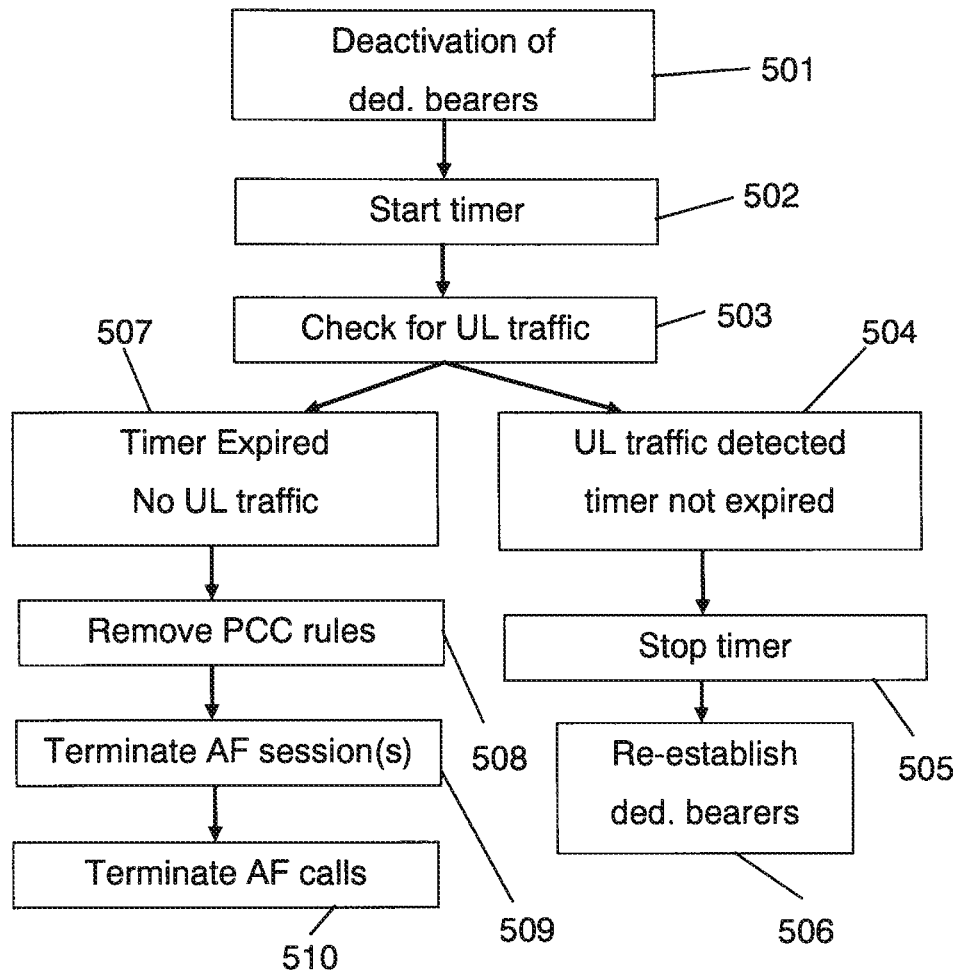
FIG. 5 is a schematic block diagram illustrating a method according to the present invention.

More in general, as is illustrated in FIG. 5, if a bearer binding function, e.g. the PCEF or BBERF receives 501 an indication that at least one dedicated bearer was deactivated with/by a temporary reason, e.g. "UE lost coverage", congestion in the network, handover, or any other applicable reason implying the bearer was deactivated due to a temporary reason, the bearer binding function triggers 502 a timer waiting for the UE to recover coverage and stores in the memory unit PCC rules related to the deactivated dedicated bearer(s).

The bearer binding function is set to check 503 for uplink traffic on any communication bearer(s) related to the UE indicating that the UE has recovered, for instance from a "UE lost coverage" condition.

As is seen in FIG. 5 two different routes are exemplified depending on the check of uplink traffic.

If the bearer binding function detects 504 uplink (UL) data traffic, and matches the uplink data traffic to any deactivated bearers for which PCC rules are saved, on the default bearer before the timer expires, the timer is stopped 505, and the bearer binding function re-establishes 506 the dedicated bearers for the policy and charging control (PCC) rules that are already installed, for instance as indicated in relation to FIG. 4 by sending appropriate parameters to the MME. It should be noted that the order of these steps may be different, e.g. the timer may be stopped before re-establishment of dedicated bearers(s).

However, if the timer expires 507 before any uplink traffic is detected, the bearer binding function initiates that PCC rules are removed 508, AF session(s) are deactivated 509, and calls are terminated 510 by the AF.

In another embodiment of the present invention the PCRF may be arranged to indicate whether a PCC rule is to be handled in the way described above, i.e. PCEF/BBERF runs a timer before it removes the PCC rule or until a packet fits the rule and a dedicated bearer is re-activated, by adding some additional PCC rule information e.g. simple flag, or as well including a timer value that the PCEF/BBERF should use. A recovery timer may be related to each PCC rule. Advantageously, PCC rules provide QoS parameters that may indicating service priority.

The PCRF may be configured with services to be enhanced with the enhancements described above, but the PCRF may also get a request from the AF, e.g. over Rx interface, to apply the enhancements.

Main problem area is to get faster back to service after a user been out of coverage, but potentially also for other situations, e.g. when bearers are deactivated temporarily due to resource issues in a radio area network (RAN).

The difference between GPRS and EPC is that CN bearers are deactivated when the radio bearer is lost, i.e. preservation procedures have been removed in EPC (and for GPRS with network controlled QoS). EPC has been used as for exemplifying a suitable network architecture, but it should be noted that the basic idea of the invention may be applicable also in for instance CDMA2000 based networks, e.g. with an access gateway (A-GW).

In mobility procedures where the network end of the bearer moves from one node to another, e.g. at S-GW change with Proxy Mobile IP (PMIP) on an S5/S8 interface, the new/target node may use the same method as described above for the temporary loss of coverage described above.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

ABBREVIATIONS

| | |
|---|---|
| AF | Application Function |
| A-GW | Access Gateway |
| ARP | Allocation and Retention Priority |
| BBERF | Bearer Binding and Event Reporting Function |
| BBF | Bearer Binding Function |
| DL | Downlink |
| EMM | EPS mobility management |
| eNB | evolved Node B |
| EPC | Evolved Packet Core |
| EPS | Evolved Packet System |
| E-RAB | E-UTRAN Radio Access Bearer |
| E-UTRAN | Evolved Universal Terrestrial Radio Access Network |
| GBR | Guaranteed Bit Rate |
| GGSN | Gateway GPRS Support Node |
| GW | Gateway |
| HeNB GW | Home eNode B Gateway |

-continued

| | |
|---|---|
| HeNB | Home eNode B |
| H-PCEF | A PCEF in the HPLMN |
| H-PCRF | A PCRF in the HPLMN |
| IP-CAN | IP Connectivity Access Network |
| ISR | Idle mode Signaling Reduction |
| L-GW | Local GateWay |
| MBR | Maximum Bit Rate |
| MME | Mobility Management Entity |
| MPS | Multimedia Priority Service |
| M-TMSI | M-Temporary Mobile Subscriber Identity |
| P-GW | PDN Gateway |
| PCC | Policy and Charging Control |
| PCEF | Policy and Charging Enforcement Function |
| PCRF | Policy and Charging Rules Function |
| P-CSCF | Proxy Call Session Control Function |
| PMIP | Proxy Mobile IP |
| QCI | QoS Class Identifier |
| S-GW | Serving Gateway |
| SDF | Service Data Flow |
| S-TMSI | S-Temporary Mobile Subscriber Identity |
| TAI | Tracking Area Identity |
| TAU | Tracking Area Update |
| TI | Transaction Identifier |
| UL | Uplink |

The invention claimed is:

1. A network infrastructure device for a packet based telecommunications network, comprising: at least one processing unit, at least one memory unit, and at least one communication interface, wherein the processing unit is arranged to execute instructions sets stored in the memory unit for:
   receiving on the communication interlace an indication that a dedicated bearer for a user equipment, UE, has been deactivated;
   starting at least one timer;
   storing policy and charging control rules for services related to the deactivated bearers
   checking if uplink traffic is present for a communication bearer for the UE; and
   if uplink traffic is detected on the communication bearer: re-establishing at least one deactivated dedicated bearer; and stopping the timer.

2. The device according to claim 1, wherein the processing unit is further arranged to, if the timer expires before uplink traffic is detected on the communication bearer, execute instructions sets for:
   removing policy and charging control, PCC, rules;
   deactivating any application function, AF, sessions related to the UE; and
   initiating termination of calls by the AF.

3. The device according to claim 1, wherein the deactivation is a temporary deactivation.

4. The device according to claim 3, wherein the temporary deactivation is due to loss of radio coverage for the UE.

5. The device according to claim 1, wherein the timer is set individually for different services.

6. The device according to claim 5, wherein services comprise at least one of emergency call, standard call, streaming video connection, streaming audio connection, and web connection.

7. The device according to claim 5, wherein the services are related to policy and charging control, PCC, rules.

8. The device according to claim 1, wherein the processor is further arranged to determine the order of re-activation of dedicated bearers.

9. The device according to claim 8, wherein the order is determined using the type of service related to the dedicated bearer.

10. The device according to claim 1, wherein the device is arranged to operate in an evolved packet core, EPC, network.

11. The device according to claim 1, wherein the device is arranged to operate in a CDMA2000 network.

12. The device according to claim 1, wherein the processor is further arranged to check the detected traffic on the communication bearer, match the traffic to a deactivated dedicated bearer, and re-establish the matched deactivated dedicated bearer.

13. The device according to claim 1, wherein the processor is further arranged to receive, via the communication interface from a policy and charging rules function, PCRF, node, a message that indicates that the timer is to be used for a deactivated dedicated bearer.

14. The device according to claim 1, wherein the communication bearer is one of a dedicated bearer or a default bearer.

15. A method in a telecommunications network infrastructure device for handling of dedicated bearers, comprising:
   receiving on a communication interface in the device an indication that a dedicated bearer for a user equipment, UE, has been deactivated;
   starting at least one timer;
   checking if uplink traffic is present for a communication bearer; and
   if uplink traffic is detected on the communication bearer:
      re-establishing at least one dedicated bearer; and stopping the timer.

16. The method according to claim 15, wherein the step of starting at least one timer comprises starting a timer for each service related to a deactivated dedicated bearer.

17. A system, in a telecommunications network, for handling activation of dedicated bearers, comprising:
   a mobility management node, MME;
   a gateway node, GW;
   wherein the MME is arranged to send a deactivation message to the GW, the GW is arranged to
   receive the deactivation message;
   start at least one timer;
   check if uplink traffic is present for a communication bearer and if uplink traffic is detected on the communication bearer: re-establish the dedicated bearer by sending an establishment message to the MME for re-establishment of at least one dedicated bearer; and stop the timer related to the dedicated bearer.

* * * * *

UNITED STATES PATENT AND TRADEMARK OFFICE
CERTIFICATE OF CORRECTION

| | | |
|---|---|---|
| PATENT NO. | : 8,675,567 B2 | Page 1 of 1 |
| APPLICATION NO. | : 13/547623 | |
| DATED | : March 18, 2014 | |
| INVENTOR(S) | : Lovsen et al. | |

It is certified that error appears in the above-identified patent and that said Letters Patent is hereby corrected as shown below:

On the Title Page, in Column 1, below Prior Publication Data,
insert -- (30) Foreign Application Priority Data
July 14, 2011 (WO)............ PCT/EP2011/062094. --.

In the Specification:

In Column 4, Line 50, delete "PRCF" and insert -- PCRF --, therefor.

In the Claims:

In Column 7, Line 31, in Claim 1, delete "interlace" and insert -- interface --, therefor.

Signed and Sealed this
Fifteenth Day of July, 2014

Michelle K. Lee
*Deputy Director of the United States Patent and Trademark Office*